(12) United States Patent
Guan et al.

(10) Patent No.: US 10,420,096 B2
(45) Date of Patent: Sep. 17, 2019

(54) LTE-D COMMUNICATIONS FOR V2X APPLICATION

(71) Applicant: QUALCOMM Incorporated, San Diego, CA (US)

(72) Inventors: Wei Guan, Bridgewater, NJ (US); Shailesh Patil, Raritan, NJ (US); Libin Jiang, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 15/247,739

(22) Filed: Aug. 25, 2016

(65) Prior Publication Data

US 2017/0127413 A1    May 4, 2017

Related U.S. Application Data

(60) Provisional application No. 62/250,931, filed on Nov. 4, 2015.

(51) Int. Cl.
| | |
|---|---|
| *H04W 4/00* | (2018.01) |
| *H04W 72/04* | (2009.01) |
| *H04W 72/12* | (2009.01) |
| *H04L 5/00* | (2006.01) |

(52) U.S. Cl.
CPC ....... *H04W 72/0446* (2013.01); *H04L 5/0053* (2013.01); *H04W 72/0453* (2013.01); *H04W 72/1263* (2013.01); *H04W 72/1289* (2013.01); *H04L 5/0091* (2013.01)

(58) Field of Classification Search
CPC ......... H04W 72/0446; H04W 72/0453; H04W 72/1263; H04W 72/1289; H04L 5/0053
See application file for complete search history.

(56) References Cited

U.S. PATENT DOCUMENTS

| | | | | |
|---|---|---|---|---|
| 9,374,259 | B2 * | 6/2016 | Tabet | H04L 27/2649 |
| 9,730,174 | B2 * | 8/2017 | Seo | H04W 56/002 |
| 9,743,425 | B2 * | 8/2017 | Yang | H04L 5/00 |
| 9,843,414 | B2 * | 12/2017 | Winstead | H04L 1/0063 |
| 10,111,251 | B2 * | 10/2018 | Martin | H04W 74/08 |
| 10,194,453 | B2 * | 1/2019 | Martin | H04W 72/12 |
| 2014/0301299 | A1 | 10/2014 | Wu | |

FOREIGN PATENT DOCUMENTS

| | | |
|---|---|---|
| WO | 2014147673 A1 | 9/2014 |
| WO | 2015066904 A1 | 5/2015 |
| WO | 2016159712 A1 | 10/2016 |

OTHER PUBLICATIONS

International Search Report and Written Opinion—PCT/US2016/048921—ISA/EPO—dated Nov. 7, 2016.

\* cited by examiner

*Primary Examiner* — Stephen M D Agosta
(74) *Attorney, Agent, or Firm* — Arent Fox LLP

(57) ABSTRACT

In an aspect of the disclosure, a method, a computer-readable medium, and an apparatus are provided. The apparatus is configured to transmit a first SA information in a first subframe. The apparatus is further configured to transmit a first data in the first subframe. The apparatus is configured to transmit a second SA information in a second subframe. The apparatus is also configured to transmit a second data in the second subframe. The first SA information includes information on the first data and the second data. The second SA information includes information on the second data.

27 Claims, 10 Drawing Sheets

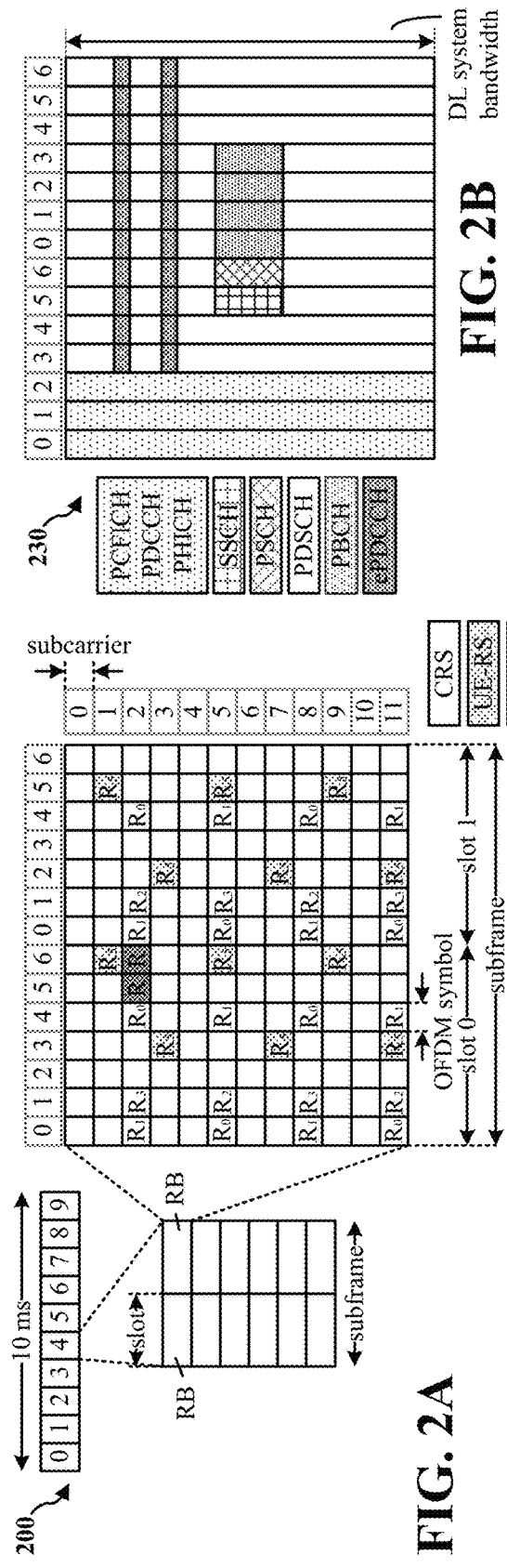
FIG. 2A
FIG. 2B
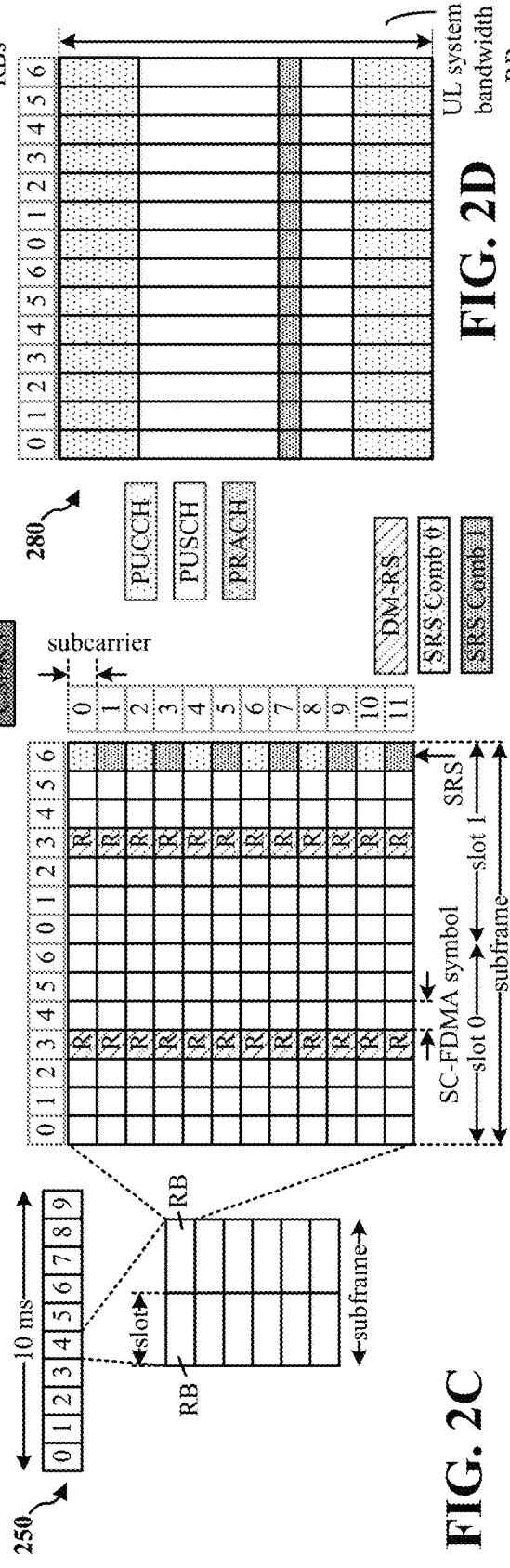
FIG. 2C
FIG. 2D

LTE-D COMMUNICATIONS FOR V2X APPLICATION

CROSS-REFERENCE TO RELATED APPLICATION(S)

This application claims the benefit of U.S. Provisional Application Ser. No. 62/250,931, entitled "LTE-D COMMUNICATIONS FOR V2X APPLICATION" and filed on Nov. 4, 2015, which is expressly incorporated by reference herein in its entirety.

BACKGROUND

Field

The present disclosure relates generally to communication systems, and more particularly, to scheduling assignments and data transmissions.

Background

Wireless communication systems are widely deployed to provide various telecommunication services such as telephony, video, data, messaging, and broadcasts. Wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

In the context of vehicle-to-x (V2X) applications, vehicles may have high moving speed and/or density, which may significantly degrade the performance in legacy communication systems. Accordingly, modifying communications systems for V2X may be advantageous.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. The summary's sole purpose is to present some concepts of one or more aspects in a simplified form as a prelude to the more detailed description that is presented later.

As discussed above, in the context of V2X applications, vehicles may have high moving speed and/or density, which may significantly degrade the performance of V2X communication using legacy communication systems. Performance may be degraded for the following reasons. First, each V2V transmission may lead to significant in-band emissions. Second, persistent interference on scheduling assignment (SA) transmissions may lead to degradation of performance. In some systems, SA transmissions may use a deterministic hopping pattern. Using a deterministic hoping pattern may lead to persistent collisions. A collision is when two or more UEs select the same first SA resource and will also transmit on the same resource for second transmission. If the SA cannot be decoded then data also may not be decoded.

In an aspect of the disclosure, a method, a computer-readable medium, and an apparatus are provided. The apparatus is configured to transmit a first SA information in a first subframe. The apparatus is further configured to transmit a first data in the first subframe. The apparatus is configured to transmit a second SA information in a second subframe. The apparatus is also configured to transmit a second data in the second subframe. The first SA information includes information on the first data and the second data. The second SA information includes information on the second data.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
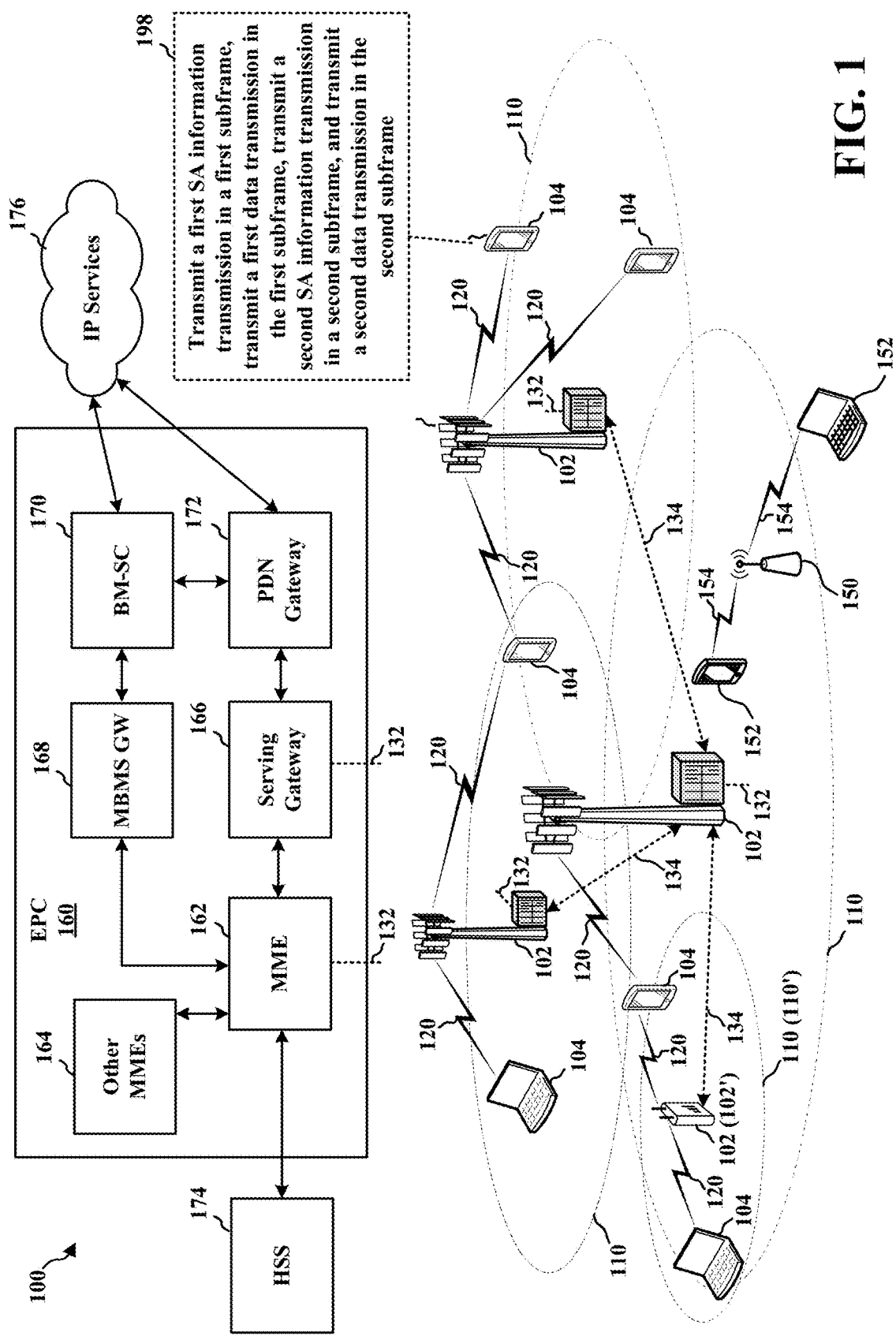
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to transmit a first SA information in a first subframe and transmit a first data in the first subframe. The UE 104 may also be configured to transmit a second SA information in a second subframe. Additionally, the UE 104 may be configured to transmit a second data in the second subframe. The first SA information includes information on the first data and the second data. For example, the information may be information about where the data is located, e.g., time frequency resource blocks for the first data and the second data. Additionally, the second SA information transmission includes information on the second data. For example, the information may be information about where the data is located, e.g., time frequency resource blocks for the second data (198).

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
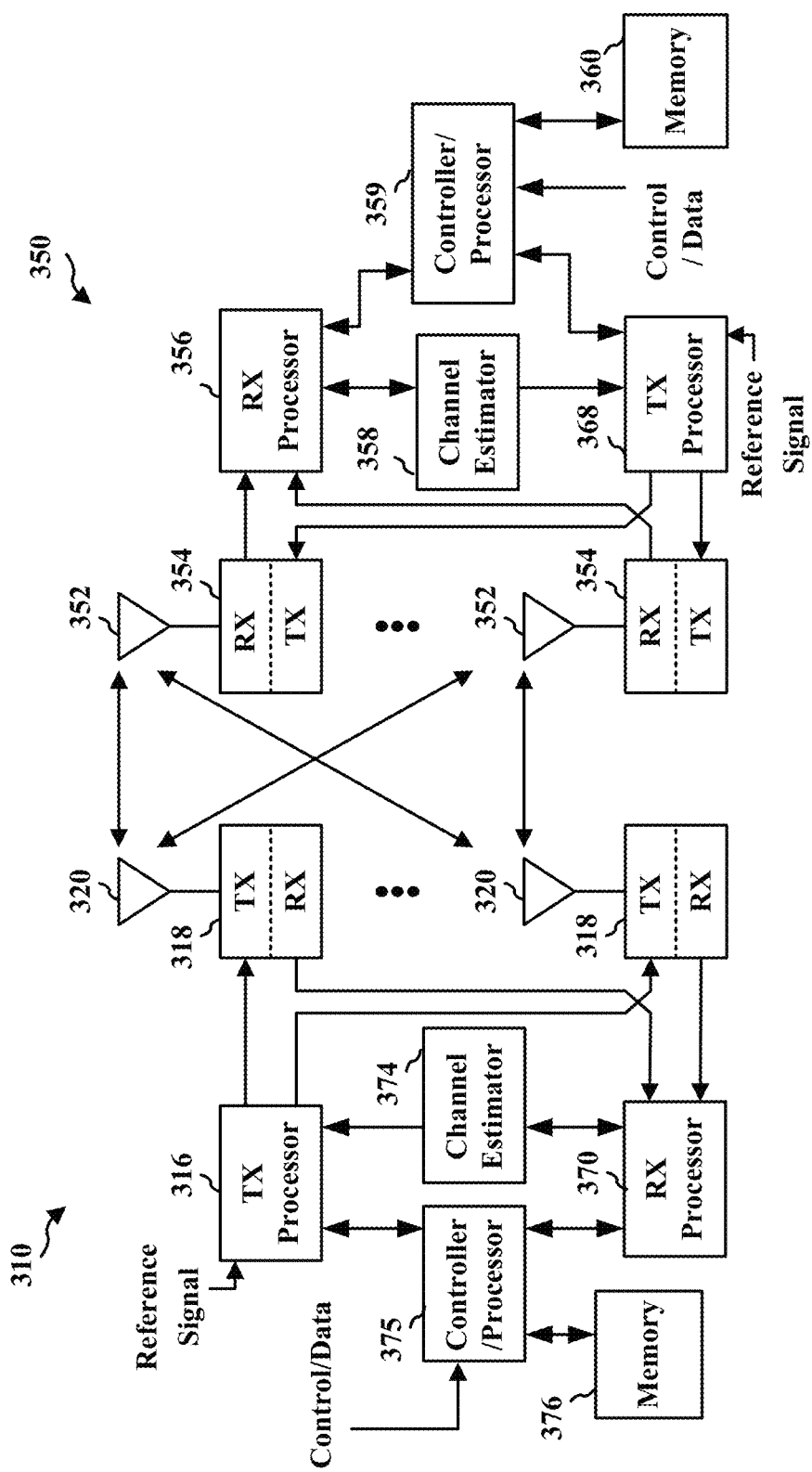
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
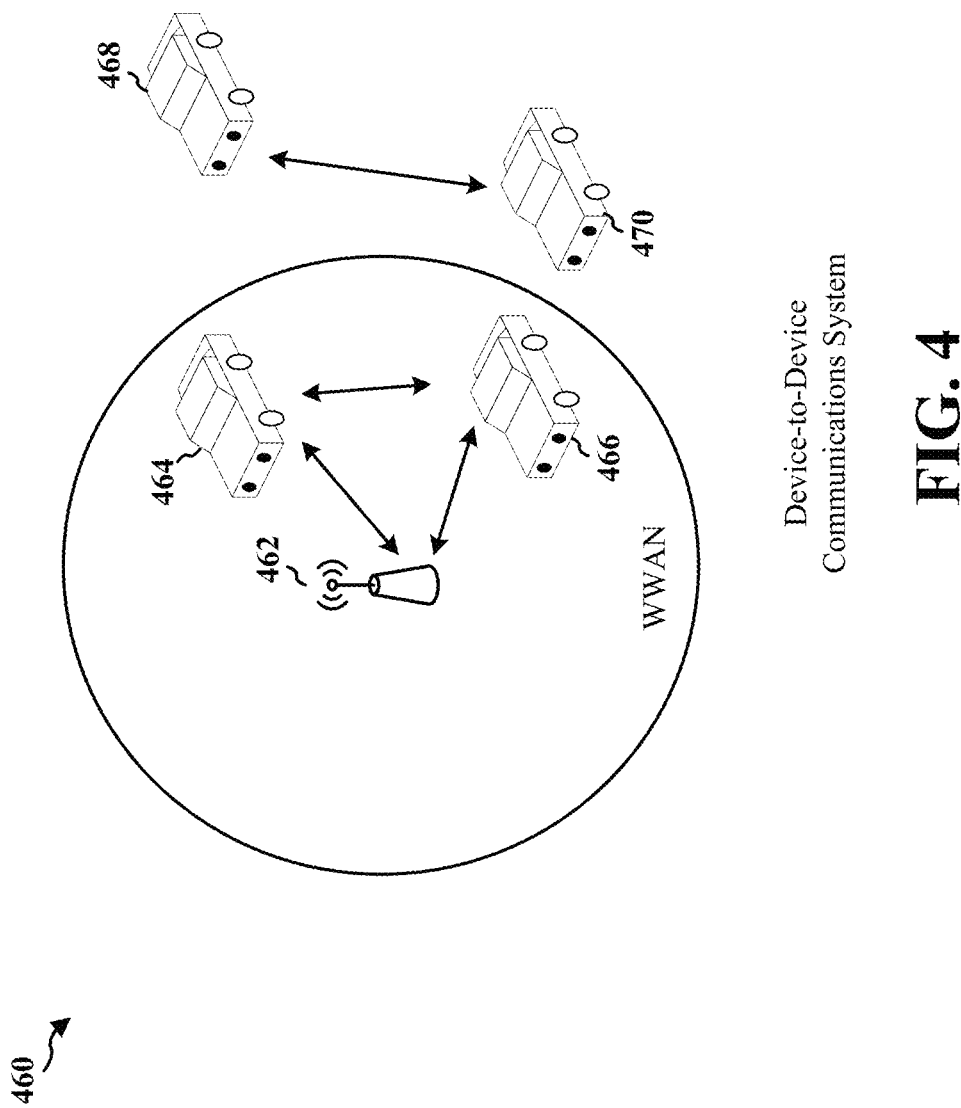
FIG. 4 is a diagram of a device-to-device communications system.

FIG. 4 is a diagram of a vehicle-to-vehicle (V2V) communications system 460. The V2V communications system 460 includes a plurality of UEs 464, 466, 468, 470 in vehicles. The V2V communications system 460 may overlap with a cellular communications system, such as for example, a WWAN. Some of the vehicles (using UEs 464, 466, 468, 470) may communicate together in V2V communication using the DL/UL WWAN spectrum, some may communicate with the base station 462, and some may do both. For example, as shown in FIG. 4, the UEs 468, 470 are in V2V communication and the UEs 464, 466 are in V2V communication. The UEs 464, 466 are also communicating with the base station 462. The V2V communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless V2V communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Figure 5:
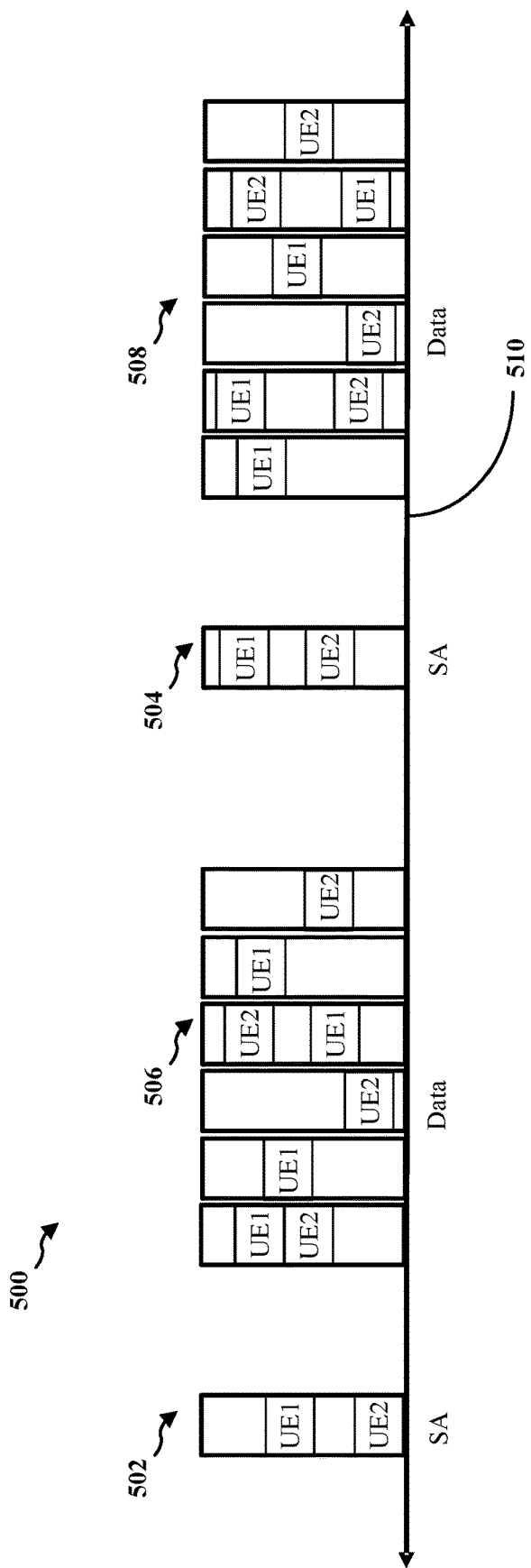
FIG. 5 is a diagram illustrating an LTE-D traffic design in a licensed band.

FIG. 5 is a diagram 500 illustrating an LTE Direct (LTE-D) traffic design in a licensed band. LTE Direct is an LTE version that allows for device-to-device (D2D) (or V2V) communications in which two UEs communicate directly via LTE and not via a network. For example, as illustrated in FIG. 4, wireless devices 468, 470 may communicate directly without using base station 462. LTE-D2D was standardized in Release 12. One of the components standardized in LTE-D was D2D communication in the licensed band. LTE-D communications may include scheduling assignment (SA) information 502, 504 and data transmissions 506, 508. SA information 502, 504 may be used for transmission of control information. In FIG. 5, the horizontal line 510 represents time. The vertical axis of the graph (no y-axis is illustrated) represents frequency. FIG. 5 illustrates two times when SA information 502, 504 may be transmitted. UE1 and UE 2 each transmit SA information 502, 504 during the two times. FIG. 5 illustrates two sets of times when data transmissions 506, 508 may occur. In the example of FIG. 5, the data transmissions 506, 508 each include six subframes. UE1 and UE2 may transmit data at various times illustrated in FIG. 5, e.g., during each of the six subframes for the data transmissions 506, 508.

In some examples, the network may reserve separate resources for each channel. These pools of separate resources may occur periodically, e.g., as illustrated in FIG. 5. For example, each of the separate resources for each channel may occur at regular intervals. In other examples, each of the separate resources for each channel may occur from time to time, but not necessarily at periodic intervals. Before the data transmissions 506, 508, a UE, e.g., UE1, or UE2, may need to broadcast the SA information 502, 504 in that UE's resource pool. The SA information 502, 504 may be used by other UEs, e.g., UE1, or UE2, to learn about the data being transmitted by the transmitting UE, e.g., UE2, or UE1. For example, the SA information 502, 504 may include information such as a time of a data transmission, a frequency of the data transmission, a location of the data transmission, a modulation of the data transmission, a coding scheme of the data transmission, and other information related to the data transmission, other SA information transmissions, or both.

To indicate the time information of the resources used for data transmissions 506, 508 the SA information 502, 504 may contain a field called time domain resource pattern of transmission (T-RPT). The T-RPT may be a number that may be mapped to a bitmap that may indicate the position in time of all time resources used for data transmission. Using the T-RPT, the receiving UEs, e.g., UE1, or UE2, may learn where to find the associated data, e.g., where the data resides in transmissions 506, 508. FIG. 5 illustrates example positions in time of time resources used for data transmissions 506, 508. As illustrated in FIG. 5, UE1 and UE2 may each transmit SA information 502, 504 in the SA resource pool and then transmit data in transmissions 506, 508 in the data resource pool according to the T-RPT pattern.

In the context of vehicle-to-x (V2X) applications, such as vehicle-to-vehicle (V2V) applications, vehicles may have high moving speed, high density, or both. High moving speed and high density may each significantly degrade the performance of a communication system when a legacy design is used. High moving speed and high density may each significantly degrade the performance of a communication system for two main reasons. First, each transmission may lead to significant in-band emissions. Second, the communication transmissions may cause persistent interference on a SA information transmission. In Release 12, SA information transmissions use a deterministic hopping pattern that may lead to persistent collisions. Two UEs, e.g., UE1, or UE2, selecting the same first SA resource, e.g., SA information 502, at the same frequency rather than at different frequencies, will also transmit on the same resource for a second data transmission. (FIG. 5 illustrates the use of different frequencies.) When two UEs, e.g., UE1, or UE2, select the same first SA resource and transmit on the same resource the SA information of one or more of the UEs, e.g., UE1, or UE2, may not be decodable by one or more other UEs, e.g., UE2, or UE1, respectively. When SA information 502, 504 is not decoded data cannot be decoded either.

Figure 6:
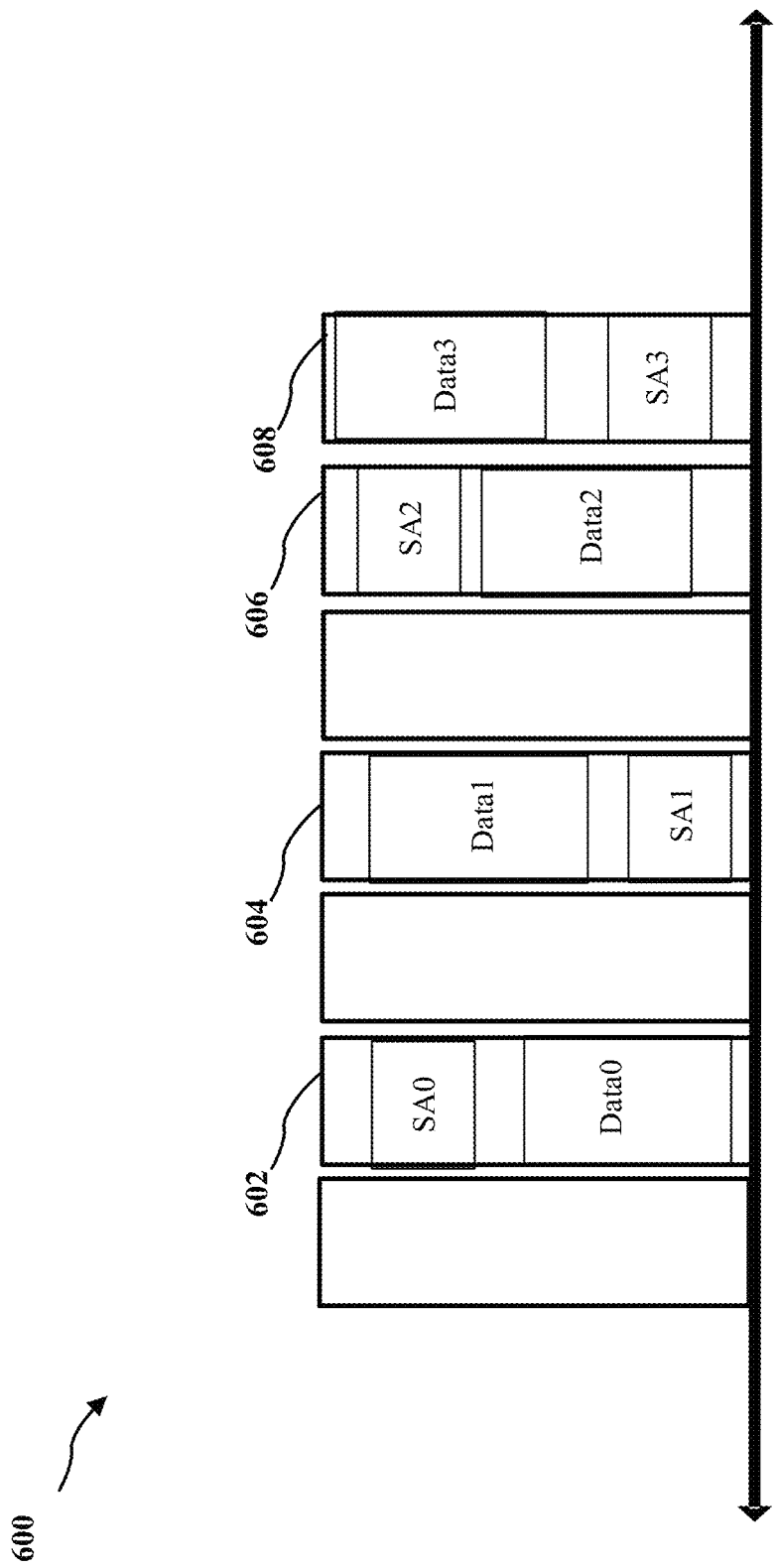
FIG. 6 is a diagram illustrating an example of SA and data transmitted using the same subframes in accordance with the systems and methods described herein.

FIG. 6 is a diagram 600 illustrating an example of SA information, SA0, SA1, SA2, SA3 and data Data0, Data1, Data2, Data3 transmitted using the same subframes 602, 604, 606, 608 in accordance with the systems and methods described herein. More specifically, in the example illustrated in FIG. 6, Data0 and SA0 are in the same subframe; Sa1 and Data 1 are in the same subframe, SA2 and Data 2 are in the same subframe; and SA3 and Data 3 are in the same subframe. To counter an inability to decode data that may occur when two UEs select the same first SA resource, the SA information SA0, SA1, SA2, SA3 and the data Data0, Data1, Data2, Data3 may be transmitted in the same subframe 602, 604, 606, 608 as illustrated in FIG. 6. Transmitting the SA information SA0, SA1, SA2, SA3 and the data Data0, Data1, Data2, Data3 on the same subframe 602, 604, 606, 608 may reduce the overall in-band emissions in the system because the number of subframes on which transmissions occur is reduced from six subframes to four subframes 602, 604, 606, 608.

In some examples, the SA information SA0, SA1, SA2, SA3 and data Data0, Data1, Data2, Data3 may be transmitted either on adjacent or non-adjacent resource blocks (RBs). The SA information SA0, SA1, SA2, SA3 and data Data0, Data1, Data2, Data3 may be transmitted using multi-cluster single carrier frequency division multiple access (SC-FDMA) transmissions. Transmitting SA information and data in non-adjacent resource blocks in the same subframe may have a more significant link budget impact.

In an example, SA information SA0, SA1, SA2, SA3 may be transmitted for every data Data0, Data1, Data2, Data3 transmission, e.g., on the same subframe. For example, SA information SA0, SA1, SA2, SA3 may be transmitted for every subframe that includes a data Data0, Data1, Data2, Data3 transmission. The SA resource/subframe may be randomly selected in the same way that data slots are selected. Randomly selecting the SA resource/subframe may avoid persistent SA collisions. Furthermore, the SA information SA0, SA1, SA2, SA3 may contain information like the number of the transmission. For example, the first SA information, e.g., SA0, may identify itself as the first SA information and point to the data Data0 transmission in the same subframe as SA0 and Data1, Data2, Data3 transmissions on the subframes that follow. The second SA information, e.g., SA1, may identify itself as the second SA information and point to the data Data1, Data2, Data 3 transmissions, e.g., point to the transmission location of Data1, Data2, Data3 in time and frequency.

Using a first SA information transmission, e.g., SA0, during the first subframe, e.g., 602 that identifies itself as the first SA information transmission and points to the data transmissions on the subframes 602 and the following subframes 604, 606, 608 and a second SA information transmission, e.g., SA1, during the second subframe, e.g. 604, that identifies itself as the second SA information transmission and points to the data on the subframe 604 and the following subframes 606, 608 will allow a receiver to combine multiple data transmissions. The combining of multiple data transmissions may be either incrementally redundant, e.g., partially redundant; or chase combined, e.g., a redundant copy of previously transmitted data.

In one example, a UE may use an SA information transmission to transmit the complete data pattern, but with the addition of an indicator of the current transmission number. In another example, a system implementing the methods described herein may use System Frame Number (SFN) numbers (or some other timing information) of a data transmission to determine the transmission number of an SA information transmission. The receiving UE may also use the current SFN or other timing information to determine the transmission number of the current data transmission. An example is illustrated in FIG. 6 where SA0 points to data transmissions numbers 0 through 3, for example. Sa1 points to data transmission numbers 1 through 3 and so on, for example.

In the illustrated example of FIG. 6, there are four SA information transmissions, i.e., four transmissions of SA information, and four data transmissions, i.e., four transmissions of data. Additionally, the four SA information transmissions and four data transmissions are each paired together in the same subframes 602, 604, 606, 608 as illustrated in FIG. 6. In other words, in the illustrated example of FIG. 6, SA0 is paired with Data0 in subframe 602, Sa1 is paired with Data1 in subframe 604, SA2 is paired with Data2 in subframe 606, and SA3 is paired with Data3 in subframe 608. In the illustrated example of FIG. 6, the number of SA information transmission/data transmission pairs is four, i.e., n=4. The systems and methods described herein may be applied for SA information transmission/data transmission pairs for n≥2. Additionally, the SA information transmission may include information on the current data transmission, the current SA information transmission, one or more future data transmissions and/or one or more future SA information transmissions.

For example, when n=4, as illustrated in FIG. 6, the first SA information, SA0, may include information on SA0, Data0, SA1, Data1, SA2, Data2, SA3, or Data3. The second SA information, SA1, may include information on SA1, Data1, SA2, Data2, SA3, or Data3. (The second SA information could have information on SA0 and/or Data0, however, the information on SA0 and/or Data0 would serve no purpose because the transmission of SA0 and Data0 will have already occurred.) The third SA information, SA2, may include information on SA2, Data2, SA3, or Data3. The fourth SA information, SA3, may include information on SA3, or Data3.

Additionally, in an example with n≥2, the first SA information could include information on one or more of the two or more (n≥2) SA information and/or one or more of the two or more (n≥2) datas. Accordingly, in an example with n=2, the first SA information could include information on one or more of the two SA informations and/or one or more of the two datas. Similarly, in an example with n=5, the first SA information could include information on one or more of the five SA informations and/or one or more of the five datas.

In an aspect, the SA information transmissions may include SA information transmission, data transmission information, or both on a rolling basis. For example, the SA information may include information on the current SA information transmission, the current data transmission information, the next m SA information transmissions, and/or the next m data transmission information, where m≥1. For example, when m=1, the current SA information transmission, the current data transmission information, the next SA information transmissions, and/or the next data transmission information may be included in the SA information transmission. In an aspect, each of the subframes may contain one or more SA information fields and one or more data fields.

In some examples, the power used for transmission of the SA information and the power used for transmitting the one or more data may be the same. It will be understood, however, that generally, the power used for the SA information transmission and the power used for the one or more data transmissions will be different. In examples with multiple SA information transmissions, multiple data transmissions, or both, in the same subframe, the power used for each of the SA information transmissions and the power used for each of the one or more data transmissions may generally be different.

Figure 7:
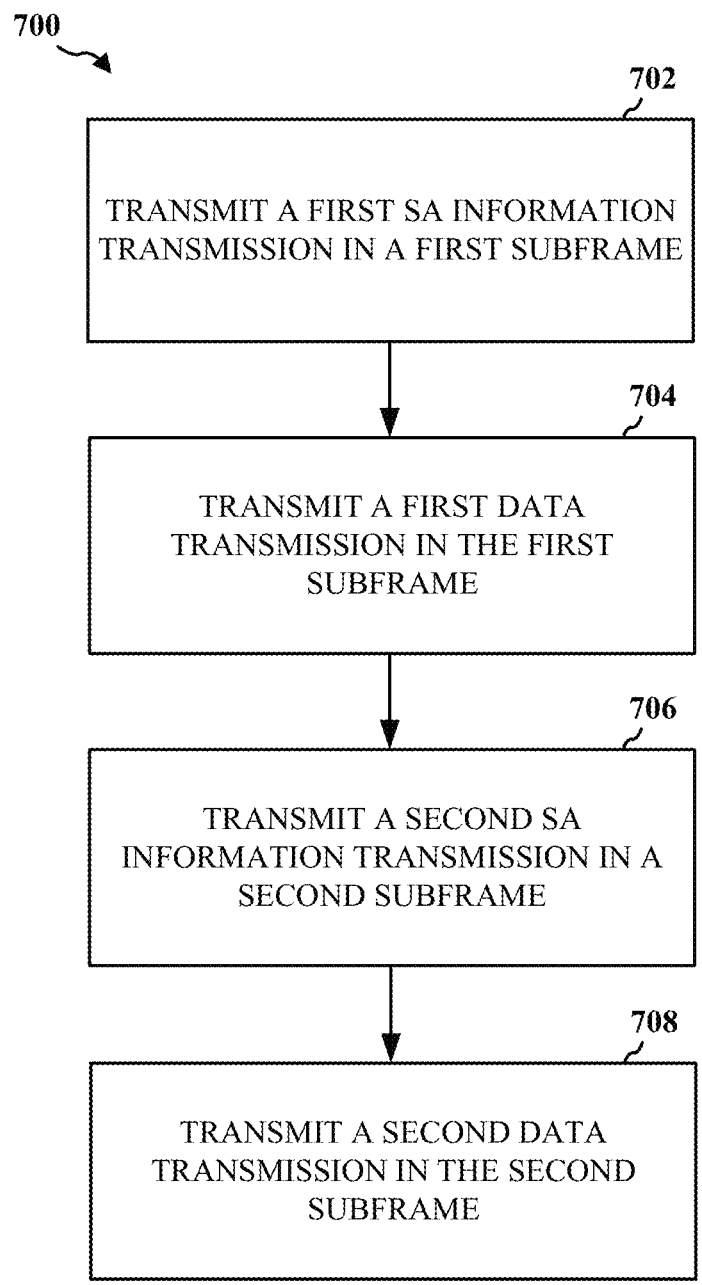
FIG. 7 is a flowchart of a method of wireless communication.

FIG. 7 is a flowchart 700 of a method of wireless communication. The method may be performed by a UE (e.g., the UE 104, 206, 650, 464, 466, 468, 470). At 702, a UE transmits a first SA information in a first subframe. For example, the UE (e.g., the UE 104, 206, 650, 464, 466, 468, 470) transmits a first SA information transmission in a first subframe. The first SA information may include a time of a first data transmission, a frequency of the first data transmission, a location of the first data transmission, a modulation of the first data transmission, a coding scheme of the first data transmission, a time of a second data transmission, a frequency of the second data transmission, a location of the second data transmission, a modulation of the second data transmission, or a coding scheme of the second data transmission. The first SA information, transmitted in the first subframe, may include information for subsequent transmissions of data and/or SA information in subsequent subframes.

In some examples, the SA resource/subframe may be randomly selected. Randomly selecting the SA resource/subframe may avoid persistent SA collisions. Furthermore, the SA information may contain information like the number of the transmission of the SA information. The first SA information transmission can indicate that the first data transmission occurs in the same subframe as the first SA information transmission, e.g., that the subframe including the SA information also includes data. For example, as illustrated in FIG. 6, SA0 and Data0 are in the same subframe; Sa1 and Data1 are in the same subframe; SA2 and DATA2 are in the same subframe; and SA3 and Data3 are in the same subframe. Additionally, the first SA information transmission may point to the data part in the subframes that follow.

At 704, a UE transmits a first data transmission in the first subframe. For example, the UE (e.g., the UE 104, 206, 650, 464, 466, 468, 470) transmits a first data transmission in the first subframe. The SA information and data may be transmitted either on adjacent or non-adjacent RBs. The SA information and data may be transmitted using multi-cluster SC-FDMA transmissions. In an example, the SA information may be transmitted for every data transmission.

At 706, a UE transmits a second SA information transmission in a second subframe. For example, the UE (e.g., the UE 104, 206, 650, 464, 466, 468, 470) transmits a second SA information transmission in a second subframe. The second SA information may include a time of a second data transmission, a frequency of the second data transmission, a location of a second data transmission, a modulation of a second data transmission, or a coding scheme of a second data transmission, as well as information for subsequent transmissions in subsequent subframes.

As discussed above with respect to the first SA transmission, in some examples, for the second SA information transmission, the SA resource/subframe may be randomly selected. Randomly selecting the SA resource/subframe may avoid persistent SA collisions. Furthermore, the SA information may contain information like the number of the transmissions. The SA transmissions and data transmissions may be assigned a series of numbers, e.g., 1, 2, 3, . . . up to some maximum number n. The number n may be based on some arbitrary, predetermined number of transmission that may be made. The number n may be reset at the start of a new series of transmissions. The second SA information transmission may indicate that the second SA information transmission is the second data transmission. Additionally, the second SA information transmission may point to the data part on the subframe in the subframes that follow.

Finally, at 708, transmitting a second data in the second subframe. For example, the UE (e.g., the UE 104, 206, 650, 464, 466, 468, 470) transmits a second data transmission in the second subframe. The second SA information and the data may be transmitted on the same subframe. As described above, the SA information and data may be transmitted either on co-located or non-co-located adjacent or non-adjacent RBs. The SA information and data may be transmitted using multi-cluster SC-FDMA transmissions. In an example, a SA may be transmitted for every data transmission. The SA resource/subframe may be randomly selected in the same way that data slots are selected. Randomly selecting the SA resource/subframe avoids persistent SA collisions. Furthermore, the SA information may contain information like the number of the transmission. For example, the first SA information transmission may identifies itself as the first SA information transmission and point to the data transmissions on the subframe and the following subframes. Accordingly, for example, assuming the first SA information refers to SA0, SA0 may provide information of Data0, Data1, Data2, DATA3, and other future data transmissions. The second SA information transmission can identifies itself as the second SA information transmission and point to the data part on the subframe and in the subframes that follow. Accordingly, for example, assuming the second SA information refers to SA1, Sa1 may provide information of Data1, Data2, DATA3, and other future data transmissions.

The first SA information transmission includes information on the first data transmission, the second data transmission and other future data transmissions. Additionally, the second SA information transmission includes information on the second data transmission and other future data transmissions.

In some examples, the first SA information may include at least one of a first time that the first data is transmitted, a first frequency that the first data is transmitted on, a location of the first data transmission, a modulation of the first data transmission, a coding scheme of the first data transmission, a time of the second data transmission, a frequency of the second data transmission, a location of the second data transmission, a modulation of the second data transmission, or a coding scheme of the second data transmission.

In some examples, the second SA information includes at least one of a second time that the second data is transmitted, a second frequency that the second data is transmitted on, a location of the second data transmission, a modulation of the second data transmission, or a coding scheme of the second data transmission.

In some examples, the second data transmission is incrementally redundant of the first data transmission. In other examples, the second data transmission is a redundant copy of the first data transmission.

In some examples, the first SA information transmission further includes an indicator of a current transmission number of the first SA information transmission and the second SA information transmission further includes an indicator of a current transmission number of the second SA information transmission.

In some examples, the first SA information transmission further includes a first timing information and the second SA information transmission further includes a second timing information. In other examples, the first timing information includes a first System Frame Number (SFN) and the second timing information includes a second SFN.

Figure 8:
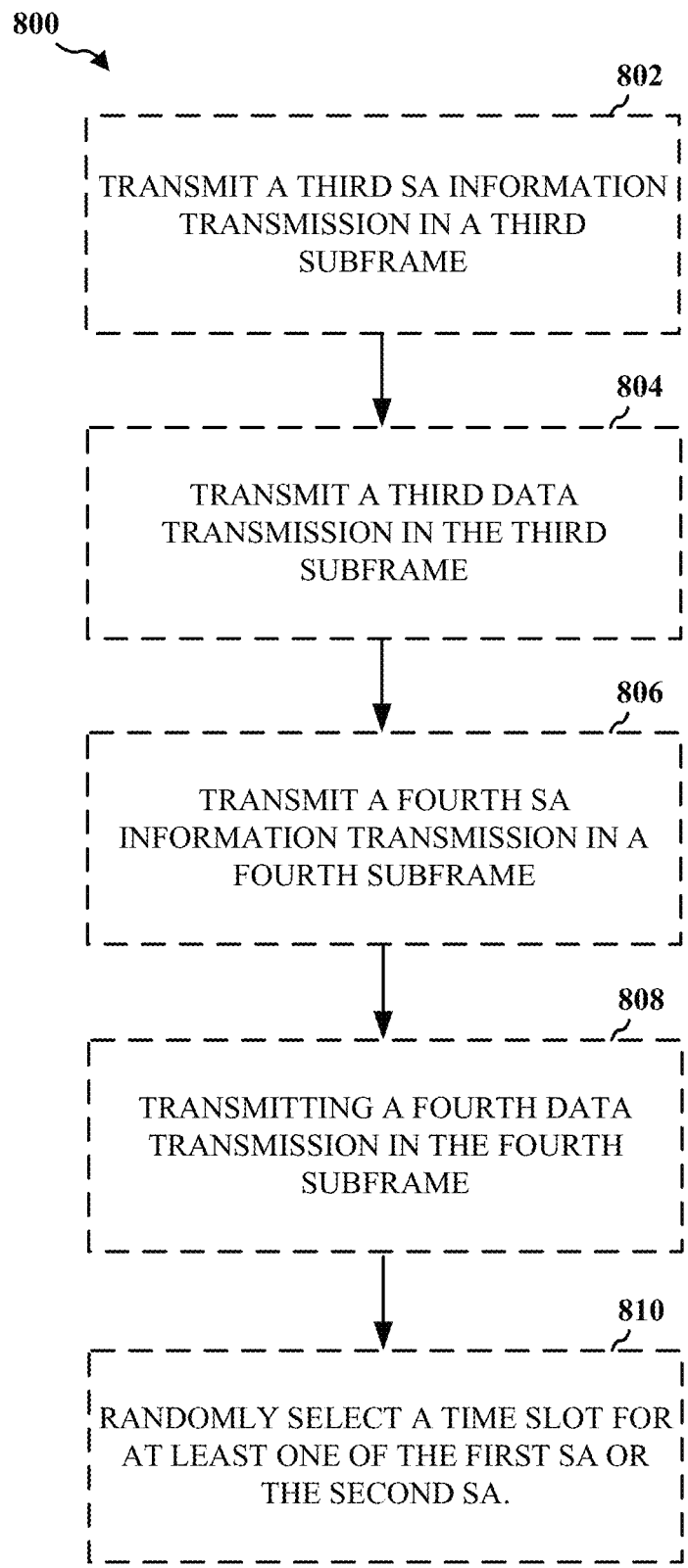
FIG. 8 is a flowchart of a method of wireless communication.

FIG. 8 is a flowchart 800 of a method of wireless communication. The method may be performed by a UE (e.g., the UE 104, 206, 650, 464, 466, 468, 470). At 802, a UE transmit a third SA information transmission in a third subframe. For example, the UE (e.g., the UE 104, 206, 650, 464, 466, 468, 470) transmits a third SA information transmission in a third subframe. The third SA information may include a time of a third data transmission, a frequency of the third data transmission, a location of the third data transmission, a modulation of the third data transmission, a coding scheme of the third data transmission, a time of a fourth data transmission, a frequency of the fourth data transmission, a location of the fourth data transmission, a modulation of the fourth data transmission, or a coding scheme of the fourth data transmission. The third SA information, transmitted in the third subframe, may include information for subsequent transmissions in subsequent subframes.

At 804, a UE transmits a third data transmission in the third subframe. For example, the UE (e.g., the UE 104, 206, 650, 464, 466, 468, 470) transmits a third data transmission in the third subframe. The SA information and data may be transmitted either on adjacent or non-adjacent RBs. The SA information and data may be transmitted using multi-cluster SC-FDMA transmissions. In an example, the SA information transmission may be transmitted for every data transmission.

At 806, a UE transmits a fourth SA information transmission in a fourth subframe. For example, the UE (e.g., the UE 104, 206, 650, 464, 466, 468, 470) transmits a fourth SA information transmission in a fourth subframe. The fourth SA information may include a time of a fourth data transmission, a frequency of the fourth data transmission, a location of a fourth data transmission, a modulation of a fourth data transmission, or a coding scheme of a fourth data transmission, as well as information for subsequent transmissions in subsequent subframes.

At 808, a UE transmits a fourth data transmission in the fourth subframe. For example, the UE (e.g., the UE 104, 206, 650, 464, 466, 468, 470) transmits a fourth data transmission in the fourth subframe. The fourth SA information and the data may be transmitted on the same subframe. As described above, the SA information and data may be transmitted either on adjacent or non-adjacent RBs. The SA information and data may be transmitted using multi-cluster SC-FDMA transmissions. In an example, SA may be transmitted for every data transmission. Furthermore, the SA information may contain information like the number of the transmission. For example, the third SA information transmission may identify itself as the third SA information transmission and point to the data transmissions on the subframe and the following subframes. The fourth SA information transmission can identify itself as the fourth SA information transmission and point to the data part on the subframe in the subframes that follow.

The first SA information transmission includes information on the first data transmission, the second data transmission, the third data transmission, and the fourth data transmission. The second SA information transmission includes information on the second data transmission, the third data transmission, and the fourth data transmission. The third SA information transmission includes information on the third data transmission and the fourth data transmission. The fourth SA information transmission includes information on the fourth data transmission.

At 810, a UE randomly selects time slot for at least one of the first SA information or the second SA information. For example, the UE (e.g., the UE 104, 206, 650, 464, 466, 468, 470) randomly selects a time slot for at least one of the first SA information or the second SA information. The SA resource/subframe may be randomly selected in the same way that data slots are selected. Randomly selecting the SA resource/subframe avoids persistent SA collisions.

Figure 9:
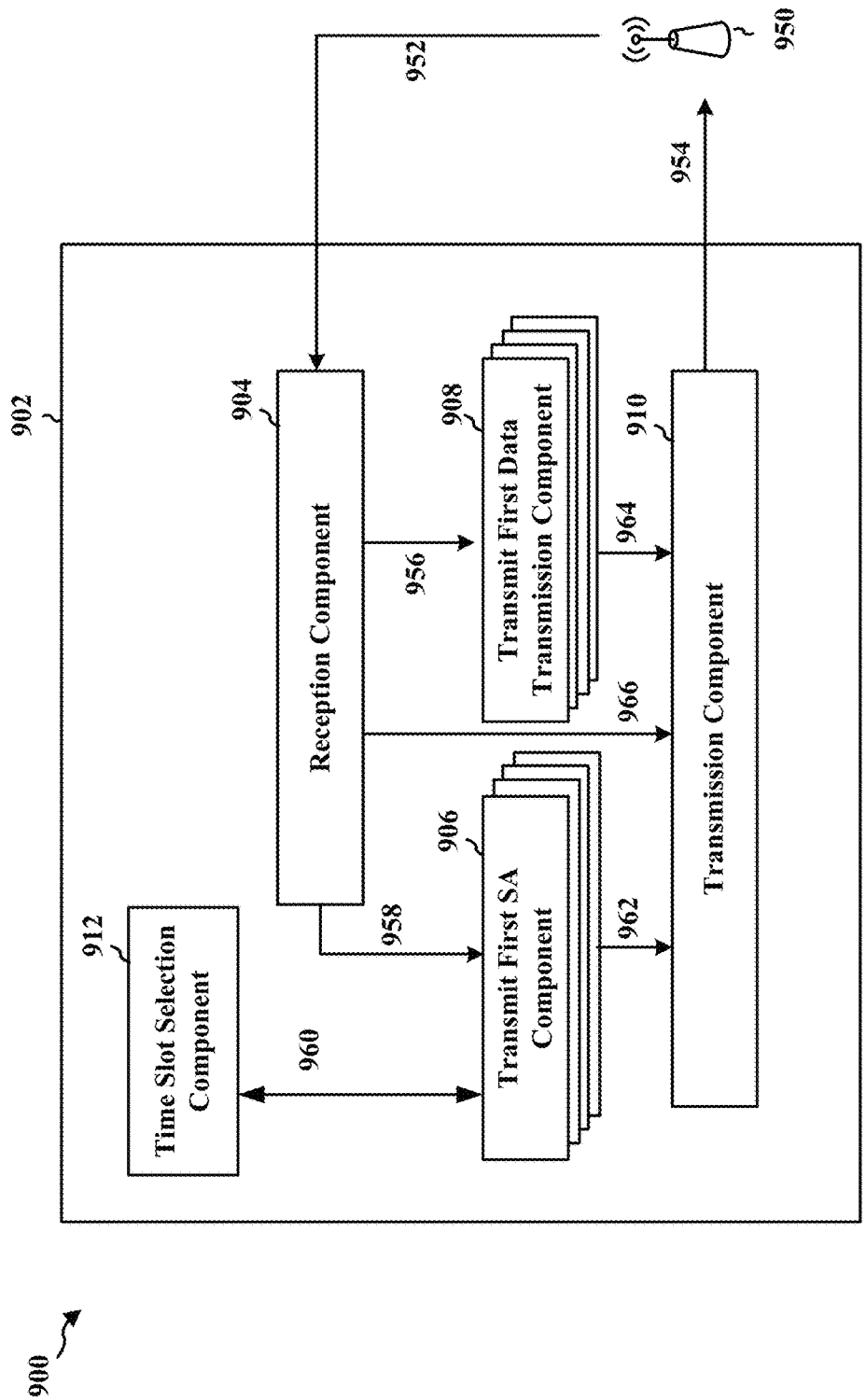
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a UE. The apparatus includes a series of transmit SA components 906 that transmit SA, a transmit data transmission component 908 that transmits data, and a time slot selection component 912 that selects a time slot. The apparatus 902 receives transmissions 952 from an eNB 950 and transmits transmissions 954 to the eNB 950. The reception component 904 may pass data to the transmit data transmission components 908 using connection 956. The reception component 904 may pass data to the transmit SA transmission components 908 using connection 958. The reception component 904 may pass data to the transmission component 910 using connection 966. The transmit SA components 906 may send and receive data with the time slot selection component 912 using connection 960. The transmit SA components 906 may pass data to the transmission component 910 using connection 962. The transmit first data components 908 may pass data to the transmission component 910 using connection 964.

The apparatus may include additional components that perform each of the blocks of the algorithm in the aforementioned flowcharts of FIGS. 7-8. As such, each block in the aforementioned flowcharts of FIGS. 7-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
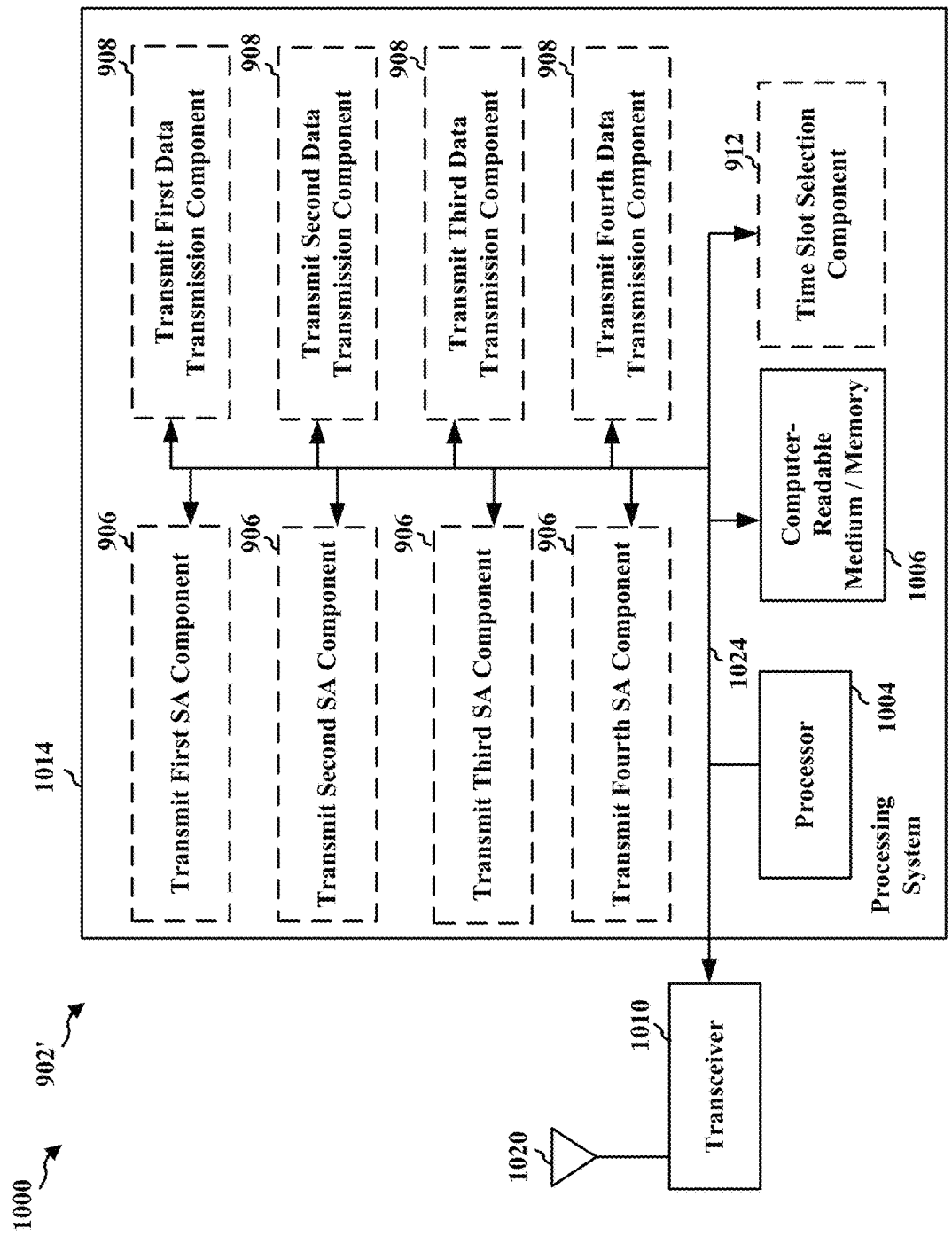
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 906, 908, 912 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 908, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 906, 908, 912. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes means for transmitting a first SA information transmission in a first subframe. Additionally, the apparatus 902/902' for wireless communication includes means for transmitting a first data in the first subframe. The apparatus 902/902' for wireless communication also includes means for transmitting a second SA information transmission in a second subframe. Additionally, the apparatus 902/902' for wireless communication includes means for transmitting a second data in the second subframe.

In another configuration, the apparatus 902/902' for wireless communication may include means for transmitting a third SA information transmission in a third subframe. The apparatus 902/902' for wireless communication may also include means for transmitting a third data transmission in the third subframe. Additionally, the apparatus 902/902' for wireless communication may include means for transmitting a fourth SA information transmission in a fourth subframe. The apparatus 902/902' for wireless communication may also include means for transmitting a fourth data transmission in the fourth subframe.

In another configuration, the apparatus 902/902' for wireless communication may include means for randomly selecting a time slot for at least one of the first SA information or the second SA information.

The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication in a user equipment (UE), comprising:
    transmitting a first scheduling assignment (SA) information in a first subframe;
    transmitting a first data in the first subframe;
    transmitting a second SA information in a second subframe;
    transmitting a second data in the second subframe;
    transmitting a third SA information in a third subframe;
    transmitting a third data in the third subframe;
    transmitting a fourth SA information in a fourth subframe; and
    transmitting a fourth data in the fourth subframe,
    wherein the first SA information further includes information about the third data and the fourth data,
    wherein the second SA information further includes information about the third data and the fourth data,
    wherein the third SA information includes information about the third data and the fourth data, and
    wherein the fourth SA information includes information about the fourth data, wherein the first SA information includes information identifying communication resources assigned for the first data and the second data, and wherein the second SA information includes information identifying communication resources assigned for the second data.

2. The method of claim 1, wherein the first SA information includes at least one of a first time that the first data is transmitted, a first frequency that the first data is transmitted on, a location of the first data, a modulation of the first data, a coding scheme of the first data, a second time that the second data is transmitted, a second frequency that the second data is transmitted on, a location of the second data, a modulation of the second data, or a coding scheme of the second data.

3. The method of claim 1, wherein the second SA information includes at least one of a time that the second data is transmitted, a frequency that the second data is transmitted on, a location of the second data, a modulation of the second data, or a coding scheme of the second data.

4. The method of claim 1, further comprising randomly selecting a time slot for at least one of the first SA information or the second SA information.

5. The method of claim 1, wherein the second data is incrementally redundant of the first data.

6. The method of claim 1, wherein the second data is a redundant copy of the first data.

7. The method of claim 1, wherein the first SA information further includes an indicator of a current transmission number of the first SA information and the second SA information further includes an indicator of a current transmission number of the second SA information.

8. The method of claim 1, wherein the first SA information further includes a first timing information and the second SA information further includes a second timing information.

9. The method of claim 8, wherein the first timing information comprises a first System Frame Number (SFN) and the second timing information comprises a second SFN.

10. An apparatus for wireless communication comprising a user equipment, the apparatus further comprising:
means for transmitting a first scheduling assignment (SA) information in a first subframe;
means for transmitting a first data in the first subframe;
means for transmitting a second SA information in a second subframe;
means for transmitting a second data in the second subframe
means for transmitting a third SA information in a third subframe;
means for transmitting a third data in the third subframe;
means for transmitting a fourth SA information in a fourth subframe; and
means for transmitting a fourth data in the fourth subframe,
wherein the first SA information further includes information about the first data, the second data, the third data, and the fourth data,
wherein the second SA information further includes information about the second data, the third data, and the fourth data,
wherein the third SA information includes information about the third data and the fourth data,
wherein the fourth SA information includes information about the fourth data, wherein the first SA information includes information identifying communication resources assigned for the first data and the second data, and wherein the second SA information includes information identifying communication resources assigned for the second data.

11. The apparatus of claim 10, wherein the first SA information includes at least one of a first time that the first data is transmitted, a first frequency that the first data is transmitted on, a location of the first data, a modulation of the first data, a coding scheme of the first data, a second time that the second data is transmitted, a first frequency that the second data is transmitted on, a location of the second data, a modulation of the second data, or a coding scheme of the second data.

12. The apparatus of claim 10, wherein the second SA information includes at least one of a time that the second data is transmitted, a frequency that the second data is transmitted on, a location of the second data, a modulation of the second data, or a coding scheme of the second data.

13. The apparatus of claim 10, further comprising means for randomly selecting a time slot for at least one of the first SA information or the second SA information.

14. The apparatus of claim 10, wherein the second data is incrementally redundant of the first data.

15. The apparatus of claim 10, wherein the second data is a redundant copy of the first data.

16. The apparatus of claim 10, wherein the first SA information further includes an indicator of a current transmission number of the first SA information and the second SA information further includes an indicator of a current transmission number of the second SA information transmission.

17. The apparatus of claim 10, wherein the first SA information further includes a first timing information and the second SA information further includes a second timing information.

18. The apparatus of claim 8, wherein the first timing information comprises a first System Frame Number (SFN) and the second timing information comprises a second SFN.

19. An apparatus for wireless communication comprising a user equipment (UE), the apparatus further comprising:
a memory; and
at least one processor coupled to the memory and configured to:
transmit a first scheduling assignment (SA) information in a first subframe;
transmit a first data in the first subframe;
transmit a second SA information in a second subframe;
transmit a second data in the second subframe;
transmit a third SA information in a third subframe;
transmit a third data in the third subframe;
transmit a fourth SA information in a fourth subframe; and
transmit a fourth data in the fourth subframe,
wherein the first SA information further includes information about the first data, the second data, the third data, and the fourth data,
wherein the second SA information further includes information about the second data, the third data, and the fourth data,
wherein the third SA information includes information about the third data and the fourth data, and
wherein the fourth SA information includes information about the fourth data, wherein the first SA information includes information identifying communication resources assigned for the first data and the second data, and wherein the second SA information includes information identifying communication resources assigned for the second data.

20. The apparatus of claim 19, wherein the first SA information includes at least one of a first time that the first data is transmitted, a first frequency that the first data is transmitted on, a first location that the first data is transmitted, a modulation of the first data, a coding scheme of the first data, a time of the second data, a second frequency that the second data is transmitted, a second location that the second data is transmitted on, a modulation of the second data, or a coding scheme of the second data.

21. The apparatus of claim 19, wherein the second SA information includes at least one of a time that the second data is transmitted, a frequency that the second data is transmitted on, a location of the second data, a modulation of the second data, or a coding scheme of the second data.

22. The apparatus of claim 19, the at least one processor further configured to randomly select a time slot for at least one of the first SA information or the second SA information.

23. The apparatus of claim 19, wherein the second data is incrementally redundant of the first data.

24. The apparatus of claim 19, wherein the second data is a redundant copy of the first data.

25. The apparatus of claim 19, wherein the first SA information further includes an indicator of a current transmission number of the first SA information and the second SA information further includes an indicator of a current transmission number of the second SA information transmission.

26. The apparatus of claim 19, wherein the first SA information further includes a first timing information and the second SA information further includes a second timing information.

27. A non-transitory computer-readable medium storing computer executable code for wireless communication on a user equipment (UE), comprising code for:

transmitting a first scheduling assignment (SA) information in a first subframe;

transmitting a first data in the first subframe;

transmitting a second SA information in a second subframe;

transmitting a second data in the second subframe;

transmitting a third SA information in a third subframe;

transmitting a third data in the third subframe;

transmitting a fourth SA information in a fourth subframe; and transmitting a fourth data in the fourth subframe, wherein the first SA information further includes information about the third data and the fourth data, wherein the second SA information further includes information about the third data and the fourth data, wherein the third SA information includes information about the third data and the fourth data, and wherein the fourth SA information includes information about the fourth data, wherein the first SA information includes information identifying communication resources assigned for the first data and the second data, and wherein the second SA information includes information identifying communication resources assigned for the second data.

* * * * *